United States Patent
Andersson

[11] Patent Number: 6,016,825
[45] Date of Patent: Jan. 25, 2000

[54] METERING DEVICE

[75] Inventor: Ulf Andersson, Jonsered, Sweden

[73] Assignee: Rigab Räddningsutrustning 1 Göteborg AG, Göteborg, Sweden

[21] Appl. No.: 09/187,639

[22] Filed: Nov. 6, 1998

[30] Foreign Application Priority Data

Jul. 9, 1998 [SE] Sweden .................................. 9802470

[51] Int. Cl.[7] .................................................. G05D 11/03
[52] U.S. Cl. ............................................. 137/88; 137/98
[58] Field of Search ................................ 137/88, 98, 100

[56] References Cited

U.S. PATENT DOCUMENTS

| | | | |
|---|---|---|---|
| 2,682,883 | 7/1954 | Phillips | 137/98 |
| 2,792,292 | 5/1957 | Adamson | 137/88 |
| 3,934,604 | 1/1976 | Sanderson et al. | 137/114 |
| 4,765,356 | 8/1988 | Hallberg | 137/88 |

*Primary Examiner*—Stephen M. Hepperle
*Attorney, Agent, or Firm*—Dvorak & Orum

[57] ABSTRACT

The invention relates to a metering device for the metered admixture of a first fluid in a second fluid. The device comprises a housing (10) with a first inlet (15, 16), a second inlet (11), and an outlet (14) for a mixture of the two fluids. The housing (10) also contains a moving body (18) which is so arranged as to be influenced by a flow of fluid through the housing and exhibits means for regulating the first fluid, in such a way that a change in the flow at the outlet (14) produces a change in the flow of the first fluid. The inlet (15, 16) for the first fluid is connected to a tubular channel (17), which is centered essentially coaxially inside the outlet (14). The body (18) is mounted so that it is capable of displacement along the outside of the tubular channel (17), against the effect of a spring device (21) acting in a direction downstream. The tubular channel (17) is provided with at least one opening (22) for the first fluid, which opening is exposed as the body (18) is displaced in a direction downstream.

20 Claims, 3 Drawing Sheets

METERING DEVICE

TECHNICAL FIELD

The present invention relates to a metering device for the metered admixture of a first fluid in a second fluid, comprising a housing with a first inlet for the first fluid, a second inlet for the second fluid, and an outlet for a mixture of the two fluids, in conjunction with which the housing contains a moving body which is so arranged as to be influenced by a flow of fluid through the housing and exhibits means for regulating the first fluid, in such a way that a change in the flow at the outlet produces a change in the flow of the first fluid.

BACKGROUND OF THE INVENTION

Previously disclosed metering devices for systems with varying flows are often cumbersome and expensive if they are executed in such a way that they can cope with precise metering within a wide flow range. This normally calls for a valve system with several moving parts, with bearing points for all of these.

One area of application for such metering devices, for example, is sprinkler systems for fire-fighting by means of foam. It is very important in such systems for the proportion of foam to be capable of being retained at an exact percentage value, e.g. from ca. 50 l/min to ca. 7000 l/min. It is difficult to achieve the desired accuracy, in particular at low flows. One example of an application for which it has proved difficult to find a solution is when the foam consists of so-called ARC (Alcohol Resistant Concentrate) foam, which belongs to the category of non-Newtonian liquids with varying viscosity and partially thixotropic characteristics.

The large flow register is explained by the requirement to cover the largest possible surfaces with one and the same system, in conjunction with which the small flow occurs when an individual section of the system is triggered, and the rest of the flow quantity occurs at the full capacity of the sprinkler system.

TECHNICAL PROBLEM

The purpose of the present invention is thus to make available a metering device in accordance with the above, which has small installation dimensions, a small number of moving parts and a low manufacturing cost as a result. A further purpose of the invention is that the metering valve must be precise and thus simple to adapt to different system applications.

SOLUTION

For these purposes the invention is characterized in that the inlet for the first fluid is connected to a tubular channel, which is centred essentially coaxially inside the outlet, in that the body is mounted so that it is capable of displacement along the outside of the tubular channel, against the effect of a spring device acting in the opposite direction to the flow, and in that the tubular channel is provided with at least one opening for the first fluid, which opening is exposed as the body is displaced in a direction downstream.

Further advantageous illustrative embodiments of the invention can be appreciated from the following sub-claims.

DESCRIPTION OF THE DRAWINGS

The invention is described below with reference to the illustrative embodiment shown in the accompanying drawings, in which.

DESCRIPTION OF ILLUSTRATED EMBODIMENT

Figure 1:
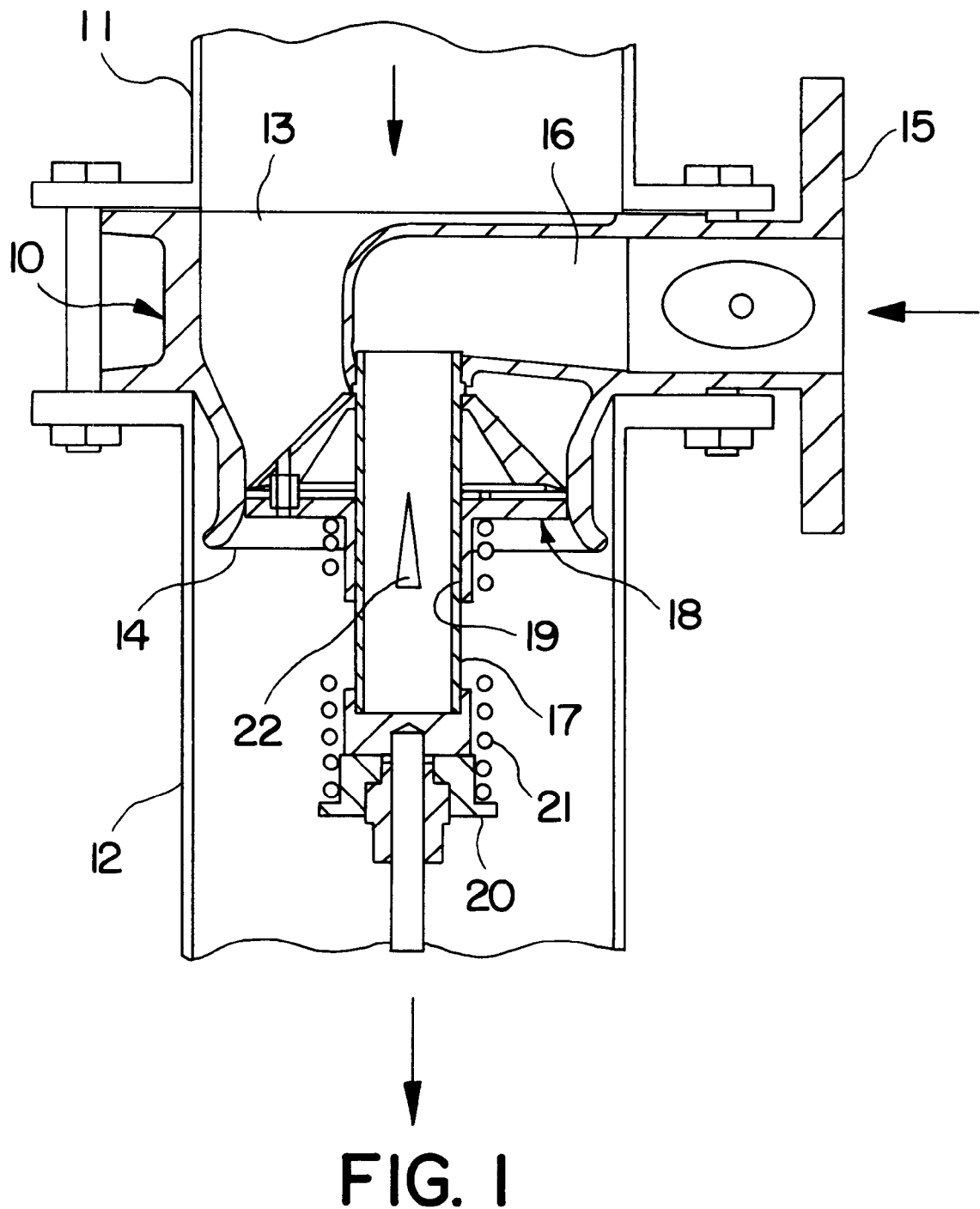
FIG. 1 shows a schematic side view of a metering device executed in accordance with the invention, which is installed in a sprinkler system.

The metering device illustrated in FIG. 1 comprises a housing 10 mounted by means of a flanged connection to a pipe 11, 12 which supplies a sprinkler system with extinguishing liquid. One connection side of the housing thus forms an inlet 13, while the other side of the housing forms an outlet 14. The housing is also provided with a laterally oriented connection piece 15 for foam concentrate.

The housing 10 is formed with an inner channel 16, which leads from the connection piece 15 to an approximately 90° elbow and into the centre of the larger flow channel 13, 14 through the housing. A tubular sleeve 17 is securely mounted to the housing 10, for example by means of a screw thread, in such a way as to form a coaxially centred axis that is directed downstream through the outlet 14 of the housing. The tubular sleeve 17 forms a support for a piston body 18 which is provided with sliding surfaces 19 intended to interact with the outside of the tubular sleeve in the absence of any free play.

A stop plug 20 forms an end stop for the piston body 18 and a retainer for a helical compression spring 21 which presses against the downstream side of the piston body and in so doing attempts to hold said body in contact with a conically shaped seat, which forms the outlet 14 from the housing.

The tubular sleeve 17 is provided with a V-shaped opening 22 to the inside of the sleeve, which opening is covered in its ineffective position by the sliding surface of the piston body and is successively exposed as the body is displaced in the downstream direction. The width of the opening is increased in this way in a direction downstream. It is possible to design this opening in many different ways for the purpose of adapting the flow curve of the inward metering for different applications. For example, the diverging lateral edges of the opening can exhibit a curved form. It is simple to produce different tubular sleeves for different applications in this way.

The seat of the outlet 14 exhibits a curved conical form, which influences and determines the flow by interacting with the peripheral surface of the moving body when the body 18 is displaced in a direction downstream. The curvature of the seat 14 provides an opening area which, for example, can increase exponentially.

Figure 3:
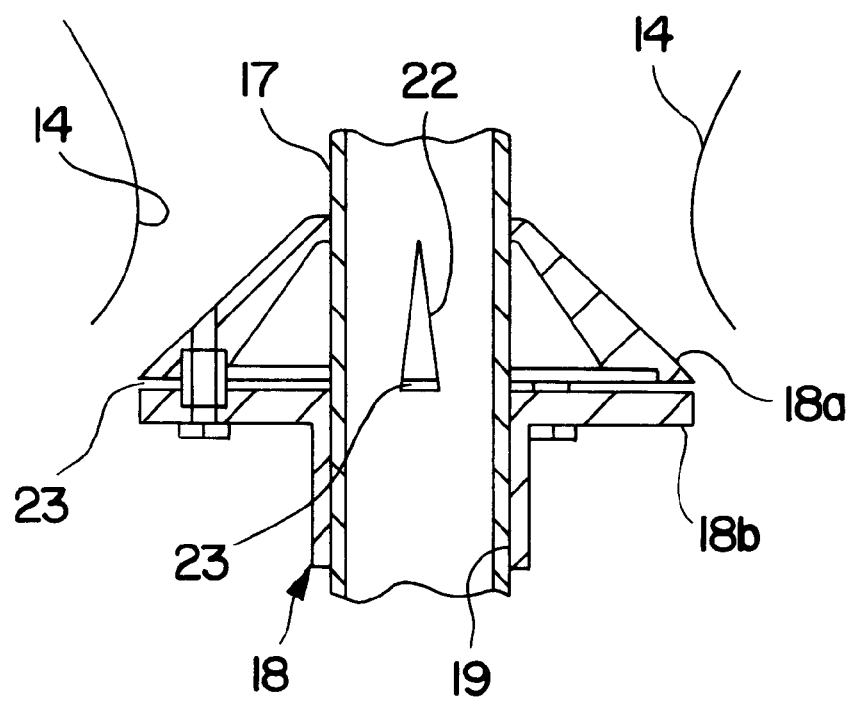
FIG. 3 is a partial enlargement of a piston body that is part of the metering device illustrated in FIG. 1, and is illustrated in an open position.

FIG. 3 shows on a larger scale a position in which the piston body has been displaced to its maximum extent in a direction downstream. In this position, a narrow slot opening 23 is present at the broader end of the V-shaped opening 22. The slot opening 23 is formed by the piston body comprising two piston halves 18a, 18b with a small distance between them. The slot opening extends radially in the form of a circle in the piston body 18 outwards to its peripheral edge. Transport of the admixture liquid is thus permitted via the channel 16, the tubular sleeve 17, the opening 22 in the tubular sleeve and the slot opening 23 in the piston body 18, in conjunction with which the actual admixture takes place around the entire peripheral edge of the piston body into the liquid as it flows past this edge.

A constant liquid pressure is normally maintained in the sprinkler system. The same fluid pressure is present on both sides of the piston body 18 when the sprinkler system is inactive. The compression spring now retains the piston body in the upper end position shown in FIG. 1. The pressure of the admixture liquid should preferably be in equilibrium with the pressure in the sprinkler system.

Activation of the sprinkler system causes a drop in pressure on the outlet side of the piston body 18, whereupon the piston body is caused by the difference in pressure to move against the effect of the compression spring 21 in a direction downstream. Liquid now flows past the piston body in the area between the seat 14 and the peripheral edge of the piston body. The connection between the slot 23 and the channel 16 is opened at the same time, so that a flow opening is exposed depending on the displacement of the piston body along the tubular sleeve 17. This displacement is thus proportional to the flow through the metering device. Even when the total flow is relatively small, a large pressure drop and a high rate of flow occur in the slot between the seat 14 and the peripheral edge of the piston body. This means that the admixture is effective even at low flows in the system, and even if no extra pressure regulation of the admixture fluid occurs.

Figure 4:
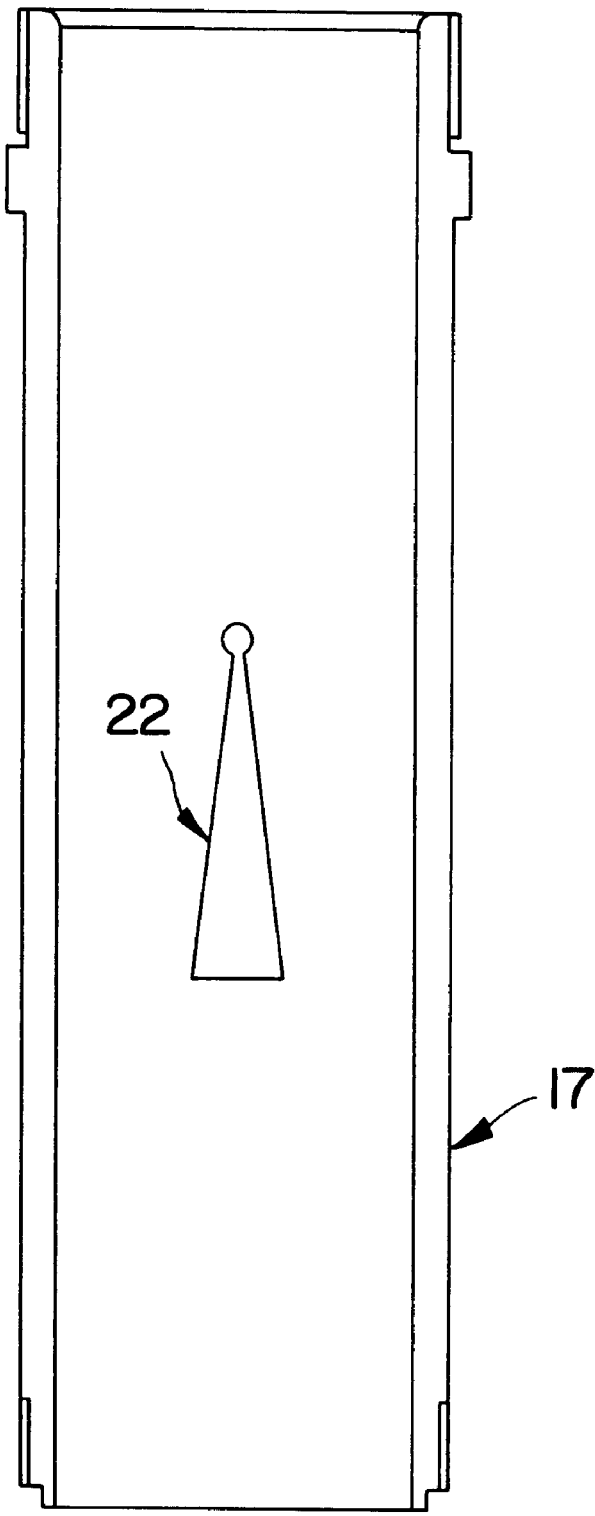
FIG. 4 shows a tubular sleeve with an opening through it.

A suitable embodiment of an opening 22 in a tubular sleeve 17 is shown in FIG. 4.

A relatively large pressure drop at a low flow is advantageous when liquids of a non-Newtonian nature are to be metered. Thanks to the design of the metering device in accordance with the invention, an almost constant pressure drop is obtained in the area of the slot between the seat 14 and the peripheral edge of the piston body, over the whole flow area. It has been found that an exponential change in the increase in the are between the seat 14 and the peripheral edge of the piston body results in accurate metering at low flows. This contributes to an equally large possible metering error, both at the start and at the end of the flow area. It is also possible to have a different design for the surface of the outlet 14, for example in order for the opening area to increase in a linear fashion. In such a case, the opening 22 in the tubular sleeve 17 appropriately has a rectangular shape.

In certain applications, it may be advantageous for the pressure drop across the metering area to reduce as it approaches maximum flow. This can be achieved by means of an interlinked spring or with cup springs.

Figure 2:
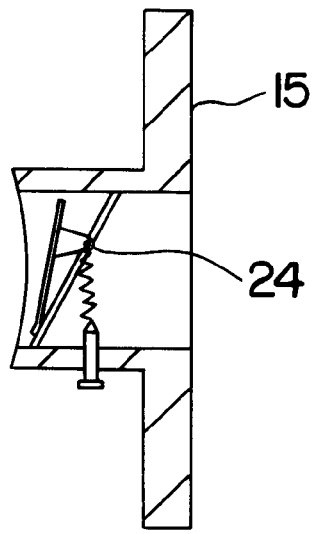
FIG. 2 shows schematically a simple adjustment device for the fine adjustment of the foam supply.

The metering quantity can be finely adjusted with the help of an adjustment valve 24 of the kind shown in FIG. 2, which is installed in the inlet 15 for the admixture liquid. This fine adjustment affects the entire flow range.

The invention is not restricted to the illustrative embodiments described above, and several variants are conceivable within the scope of the following Patent Claims. For example, the metering device can be used for metering fluids other than foam and for areas of application other than sprinkler systems for fire-fighting.

I claim:

1. Metering device for the metered admixture of a first fluid in a second fluid, comprising a housing (10) with a first inlet (15, 16) for the first fluid, a second inlet (11) for the second fluid, and an outlet (14) for a mixture of the two fluids, in conjunction with which the housing (10) contains a moving body (18) which is so arranged as to be influenced by a flow of fluid through the housing and exhibits means for regulating the first fluid, in such a way that a change in the flow at the outlet (14) produces a change in the flow of the first fluid, wherein the inlet (15, 16) for the first fluid is connected to a tubular channel (17), which is centred essentially coaxially inside the outlet (14), in that the body (18) is mounted so that it is capable of displacement along the outside of the tubular channel (17), against the effect of a spring device (21) acting in the oppostie direction to the flow, and in that the tubular channel (17) is provided with at least one opening (22) for the first fluid, which opening is exposed as the body (18) is displaced in a direction downstream.

2. Metering device as claimed in Patent claim 1, wherein the outlet (14) is formed as a conical seat, which interacts with a conical surface on the moving body (18).

3. Metering device as claimed in Patent claim 2, wherein the outlet (14) exhibits a curved conical form.

4. Metering device as claimed in Patent claim 3, wherein the curvature of the seat (14) is executed to obtain an opening area which increases exponentially.

5. Metering device as claimed in claim 1, wherein the opening (22) is V-shaped in such a way that the width of the opening increases in a direction downstream.

6. Metering device as claimed in Patent claim 5, wherein the diverging sides of the V-shaped opening (22) exhibit curvature.

7. Metering device as claimed in claim 1, wherein the spring device (21) consists of a helical compression spring.

8. Metering device as claimed in claim 1, wherein the spring constant of the spring device (21) is so arranged as to be reduced as it approaches the end of the length of travel of the body (18).

9. Metering device as claimed in claim 1, wherein the body (18) is provided with at least one internal passageway (23), which extends from the outside of the tubular channel (17) and in a radial direction out towards the peripheral edge of the body.

10. Metering device as claimed in Patent claim 9, wherein the internal passageway (23) of the body (18) is formed as a narrow slot, which is formed by two piston halves (18a, 18b) assembled with a small distance between them.

11. Metering device as claimed in claim 2, wherein the opening is V-shaped in such a way that the width of the opening increases in a direction downstream.

12. Metering device as claimed in claim 2, wherein the spring device consists of a helical compression spring.

13. Metering device as claimed in claim 2, wherein the spring constant of the spring device is so arranged as to be reduced as it approaches the end of the length of travel of the body.

14. Metering device as claimed in claim 2, wherein in the body is provided with at least one internal passageway, which extends form the outside of the tubular channel and in a radial direction out towards the peripheral edge of the body.

15. Metering device as claimed in claimed in claim 3, wherein the opening is V-shaped in such a way that the width of the opening increases in a direction downstream.

16. Metering device as claimed in claim 3, wherein the spring device consists of a helical compression spring.

17. Metering device as claimed in claim 3, wherein the spring constant of the spring device is so arranged as to be reduced as it approaches the end of the length of travel of the body.

18. Metering device as claimed in claim 3, wherein in the body is provided with at least one internal passageway, which extends form the outside of the tubular channel and in a radial direction out towards the peripheral edge of the body.

19. Metering device as claimed in claim 4, wherein the opening is V-shaped in such a way that the width of the opening increases in a direction downstream.

20. Metering device as claimed in claim 4, wherein the spring device consists of a helical compression spring.

* * * * *

UNITED STATES PATENT AND TRADEMARK OFFICE
CERTIFICATE OF CORRECTION

PATENT NO.   : 6,016,825
DATED        : January 25, 2000
INVENTOR(S)  : Ulf Andersson It is certified that error appears in the above-identified patent and that said Letters Patent is hereby corrected as shown below:

<u>Title page,</u>
Item [73], the name of the assignee should be corrected from "Rigab Räddningsutrustning 1 Göteborg AG" to read -- Rigab Räddningsutrustning i Göteborg AB --.

Signed and Sealed this

Twenty-second Day of October, 2002

Attest:

Attesting Officer

JAMES E. ROGAN
*Director of the United States Patent and Trademark Office*